US006802772B1

(12) United States Patent
Kunzle et al.

(10) Patent No.: US 6,802,772 B1
(45) Date of Patent: Oct. 12, 2004

(54) SYSTEMS AND METHODS WHEREIN AT LEAST ONE SET OF POSSIBLE INPUT PARAMETERS TO A PHYSICS SIMULATION WILL PRODUCE A SUCCESSFUL GAME RESULT

(75) Inventors: Adrian E. Kunzle, Wilmington, DE (US); V. Maximillian Garcia, New Haven, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/686,638

(22) Filed: Oct. 11, 2000

(51) Int. Cl.[7] ............................................... A63F 13/00
(52) U.S. Cl. ................... 463/2; 463/7; 463/30
(58) Field of Search .............................. 473/131, 134; 100/91; 463/1–4, 30, 36–39

(56) References Cited

U.S. PATENT DOCUMENTS

| | | | | |
|---|---|---|---|---|
| 5,146,557 A | * | 9/1992 | Yamrom et al. | 345/723 |
| 5,507,485 A | * | 4/1996 | Fisher | 473/407 |
| 5,779,549 A | * | 7/1998 | Walker et al. | 463/42 |
| 6,500,065 B1 | * | 12/2002 | Sato | 463/4 |

OTHER PUBLICATIONS

Instruction Manual, "Links 386 CD Players Manual." Published by Access Software, Inc. 1995 pp. 1–87.*
Ryan, Michael E., "Golf Software: Looking For A Great Golf Game? One of These Five Titles Should Fill The Bill; Buyers Guide", Feb. 9, 1999, PC Magazine, Section: ISSN: 0888–8507, at p. 278.
Authur Unknown, "Microsoft's 'Links LS 2000' Hole–In–One Sweepstakes Gives Users A Chance To Win A Hawaiian Vacation", Nov. 22, 1999, (http://www.microsoft.com/pre4ss/1999/nov1999/holeinonepr.asp).
Author Unknown, "Jose Maria Olazabal Enters Into Exclusive Partnership with AboutGold.com" www.AboutGolf.com—It's All About The Game, Aug., 25, 2000.
"Golfix Online Golf Games", (http://mhtml:file:///P:\User Home Directories\Ogur, Catherine\Public\Active–Cu . . . \Golfixgames.mh), download date Oct. 10, 2000.
"Super Hole–In–One Traditional V1.2a", (http://mhtml:file:///P/User Home Directories\Ogur, Cath . . . \Super Hole–In–One Traditional V1_2a.mh), download date Oct. 10, 2000.
"Shockwave Golf Game", (http://mhtml:file:///P:\User Home Directories\Ogur, Catherine\Public\A . . . \Shockwave Golf Game.mh), download date Oct. 10, 2000.
"VGA2000—Virtual Golf Association", (http://mhtml:file:///P\User Home Directories\Ogur, Catherine\Public\-Active–Curr . . . \VGA2000.mh), download date Oct. 10, 2000.
"Gamers.com>>Web>>Shockwave Golf (Shockwave)", (http://mhtml:file:///P:\User Home Directories\Gamers_com>>Web>>Shockwave Golf(Shockwave).mh) download date Oct. 10, 2000.

* cited by examiner

Primary Examiner—Jessica Harrison
Assistant Examiner—Aaron Capron
(74) Attorney, Agent, or Firm—Magdalena M. Finchan

(57) ABSTRACT

Systems and methods are provided to conduct a game associated with a physics simulation, the physics simulation being adapted to generate a game result based on a set of input parameters. According to one embodiment, a game condition associated with a game to be played by a player is established. For example, a three-dimensional terrain associated with a golf putting green may be established. It is then determined that at least one set of possible input parameters to the physics simulation will produce a successful game result given the established game condition. For example, it may be determined that a player can use his or her mouse to provide a set of inputs parameters to the physics simulation such that a simulated golf ball will reach a simulated golf hole based on the three-dimensional golf putting green terrain.

31 Claims, 16 Drawing Sheets

| PLAYER IDENTIFIER 502 | NAME 504 | CONTACT INFORMATION 506 | PAYMENT INFORMATION 508 | ACCOUNT BALANCE 510 |
|---|---|---|---|---|
| P1001 | JENNIFER JAMES | 32 GARDEN ROW BELLTOWN, USA | 1234-1244-2345-3456 (CREDIT CARD) | +$20 |
| P1002 | MICHAEL SMITH | TROLL@BRIDGE.COM | 3458-0239-0283-0293 (DEBIT CARD) | -$10 |
| P1003 | DAVID STONE | (333) 555-3333 | BGG@PAY.COM | 0 |
| P1004 | SUSAN PETERS | (478) 555-2890 | 0982-3245-7642-8933 (CREDIT CARD) | -$0.10 |
| P1005 | KEVIN WRIGHT | SDI93K@AOL.COM | BANK ACCOUNT NUMBER | +$1,000 |

| GAME IDENTIFIER 602 | PLAYER IDENTIFIER 604 | GAME TYPE 606 | GAME CONDITION(S) 608 | PLAYER INPUT PARAMETER(S) 610 | GAME RESULT 612 |
|---|---|---|---|---|---|
| G00-001 | P1001 | GOLF PUTTING | PUTTING_GREEN_TERRAIN HOLE_LOCATION | ANGLE; VELOCITY | 3 FT FROM HOLE |
| G00-002 | P1001 | GOLF PUTTING | PUTTING_GREEN_TERRAIN HOLE_LOCATION | ANGLE; VELOCITY | HOLE-IN-ONE |
| G00-003 | P1005 | BASKETBALL | HOOP_HEIGHT HOOP_DISTANCE | LOCATION; VELOCITY | $5 |
| G00-004 | P1002 | GOLF DRIVING | FAIRWAY_LAYOUT WIND | ANGLE; VELOCITY; CLUB SELECTION | 45 FT FROM HOLE |
| G00-005 | P1001 | BILLIARDS | BALL_POSITIONS | ANGLE; VELOCITY; SPIN | $0 |

FIG. 6

SYSTEMS AND METHODS WHEREIN AT LEAST ONE SET OF POSSIBLE INPUT PARAMETERS TO A PHYSICS SIMULATION WILL PRODUCE A SUCCESSFUL GAME RESULT

FIELD

The present invention relates to games. In particular, the present invention relates to systems and methods to ensure that at least one set of possible input parameters to a physics simulation will produce a successful game result.

BACKGROUND

Many players enjoy playing games that involve simulated physics. For example, many players enjoy playing computer-based golf games in which a physics simulation (e.g., a computer program) calculates a trajectory of a simulated golf ball in accordance with a set of player input parameters, such as a golf club type, a golf club velocity, and/or an angular measurement associated with a swing of a golf club. Typically, a player will use a keyboard and/or a computer mouse to generate these player input parameters. For example, a player may use a computer mouse to position a "pointer" on a display device. The location of the pointer is then used to determine an angular measurement associated with the swing of the golf club.

In addition to the player input parameters, the physics simulation calculates the trajectory of the simulated golf ball in accordance with one or more game conditions, such as a fairway layout, a three-dimensional putting green terrain, and/or a wind condition. For example, a simulated golf ball landing on a fairway may "bounce" differently as compared to one that does not land on the fairway. Similarly, a wind direction and a wind velocity may alter the flight of the simulated golf ball, and the three-dimensional putting green terrain may alter how the simulated golf ball "rolls."

Based on the calculated trajectory, the simulated golf ball will come to rest at a destination. For example, the simulated golf ball may come to rest on the putting green or in a sand trap. In the typical computer-based golf game, a successful game result is to have the simulated golf ball come to rest within a simulated golf hole (e.g., after one or more simulated golf strokes).

However, the way in which a player input parameter is generated can make it impossible for a player to produce a successful game result. Consider, for example, a golf game in which a player uses a computer mouse to position a pointer on a display device, and a player input parameter (e.g., an angular measurement associated with a swing of a golf club) is determined based the location of the pointer. A typical computer display may have a total of 1024 by 768 possible locations at which the pointer can be positioned. As a result of this granularity, there may be a first set of areas where the simulated golf ball can come to rest and a second set of areas where the simulated golf ball cannot come to rest. That is, given the initial location of the simulated golf ball and the game conditions, it may be impossible for the simulated golf ball to come to rest within the second set of areas no matter which of the 1024 by 768 possible locations are selected by the player.

Similar problems may exist with other ways of generating a player input parameter. For example, a player input parameter based on a time measurement (e.g., based on a period of time between two keystrokes) and a granularity associated with the time measurement (e.g., the time may be measured in 0.01 second increments) may result in areas where the simulated golf ball cannot come to rest. Moreover, the use of different methods to determine different player input parameters (e.g., using both a pointer location and a time measurement) can have a similar effect.

A player may not be concerned if no set of possible input parameters can produce a successful game result. For example, a player will typically not even be aware that he or she cannot select input parameters that will produce a successful game result. Moreover, players typically view this type of game as entertainment and do not have an expectation that every play of the game (e.g., every simulated swing of a golf club) will have a chance of producing a successful game result.

Consider, however, a game in which players are promised that they have a chance to win a prize based on a game result. In this case, players may be very concerned if no set of possible input parameters can produce a successful game result. For example, players who are told that a free movie ticket will be awarded whenever a simulated golf swing produces in a "hole-in-one" may become upset if they learn that, for some games, no set of possible input parameters will produce a hole-in-one. That is, the players may feel that the game is being operated in an unfair manner. This will be especially true if the players provide a payment in exchange for the chance to win the prize.

SUMMARY OF THE INVENTION

To alleviate problems inherent in the prior art, the present invention introduces systems and methods wherein at least one set of possible input parameters to a physics simulation will produce a successful game result.

One embodiment of the present invention is directed to a method of conducting a game associated with a physics simulation, the physics simulation being adapted to generate a game result based on a set of input parameters. In this case, a game condition associated with a game to be played by a player is established. It is then determined that at least one set of possible input parameters to the physics simulation will produce a successful game result given the established game condition.

Another embodiment is directed to a computer-implemented method of conducting a golf game associated with a golf simulation. The golf simulation is adapted to generate a game result based on a set of input parameters. A golf game condition is established, and it is determined that at least one set of possible input parameters to the golf simulation will produce a successful game result given the established golf game condition. After arranging for the player to provide a payment in exchange for playing the golf game, a set of player input parameters is received from a remote player device via a communication network. A game result is then determined based on the received player input parameters, the golf game condition, and the golf simulation. For example, the golf game may be associated with hitting a simulated golf ball, and the game result may comprise the simulated golf ball reaching a destination. An indication associated with the game result is transmitted to the remote player device via the communication network. It is then arranged for the player to receive a payment if the destination of the simulated golf ball is within a predetermined distance of a simulated golf hole.

According to another embodiment of the present invention, a game condition associated with a game is established. It is then determined that at least one set of possible input parameters to a physics simulation will produce a successful game result given the established game condition.

According to still another embodiment, a player or player device arranges to provide a payment in exchange for playing a game. A set of player input parameters is transmitted to a game controller via a communication network. An indication associated with a game result is then received from the game controller via the communication network. In this case, the game controller may have determined that at least one set of possible input parameters to the physics simulation will produce a successful game result given an established game condition. The player or player device then arranges to receive a payment if the game result has a predetermined relationship to a successful game result.

According to still another embodiment, a possible set of input parameters is determined. An appropriate game condition is then generated such that the possible set of input parameters to a physics simulation will produce a successful game result in accordance with the appropriate game condition.

One embodiment of the present invention comprises: means for establishing a game condition associated with a game to be played by a player; and means for determining that at least one set of possible input parameters to a physics simulation will produce a successful game result given the established game condition.

Another embodiment comprises: means for establishing a golf game condition; means for determining that at least one set of possible input parameters to a golf simulation will produce a successful game result given the established golf game condition; means for arranging for a player to provide a payment in exchange for playing the golf game; means for receiving from a remote player device a set of player input parameters via a communication network; means for determining a game result based on the received player input parameters, the golf game condition, and the golf simulation, wherein the golf game is associated with hitting a simulated golf ball and the game result comprises the simulated golf ball reaching a destination; means for transmitting to the remote player device an indication associated with the game result via the communication network; and means for arranging for the player to receive a payment if the destination of the simulated golf ball is within a predetermined distance of a simulated golf hole.

With these and other advantages and features of the invention that will become hereinafter apparent, the nature of the invention may be more clearly understood by reference to the following detailed description of the invention, the appended claims, and the several drawings attached herein.

BRIEF DESCRIPTION OF THE DRAWINGS

FIG. 5 is a tabular representation of a portion of a player database according to an embodiment of the present invention.

FIG. 6 is a tabular representation of a portion of a game database according to an embodiment of the present invention.

DETAILED DESCRIPTION

Figure 1A:
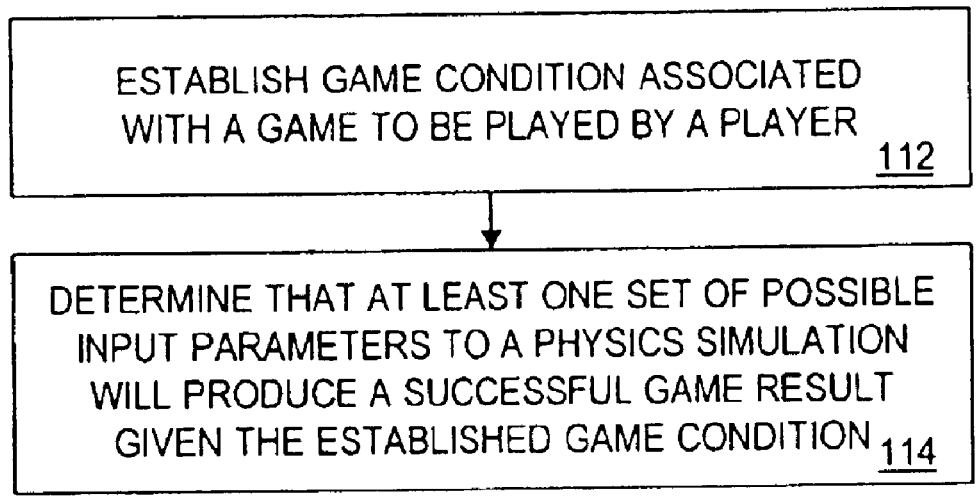
FIG. 1A is a flow chart of a method for conducting a game according to an embodiment of the present invention.

Turning now in detail to the drawings, FIG. 1A is a flow chart of a method for conducting a game according to an embodiment of the present invention. According to this embodiment, the game is associated with a physics simulation adapted to generate a game result based on a set of input parameters.

At 112, at least one game condition associated with a game to be played by a player is established. As used herein, a "game condition" can be any parameter that (i) is associated with the play of a game and (ii) is used to determine (i.e., to at least partly determine) a game result.

Figure 1B:
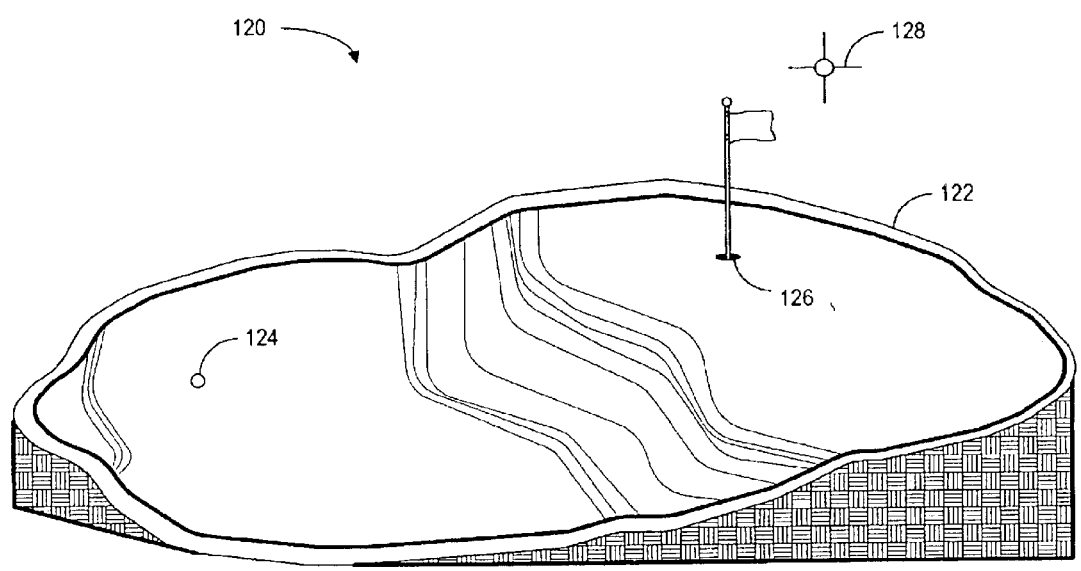
FIG. 1B illustrates a game display according to an embodiment of the present invention.

For example, consider the computer-based golf game display 120 shown in FIG. 1B. In this case, the game condition may comprise the three-dimensional putting green terrain 122 that is used to determine how a simulated golf ball will roll. Other game conditions may include, for example, an initial location 124 of a simulated golf ball and/or a simulated golf hole 126.

Note that the game condition may be established, for example, on a game-by-game basis (e.g., a new putting green terrain 122 may be generated for each game). According to another embodiment, the game condition is established and used for a plurality of different games.

FIG. 1B also illustrates a game pointer 128 that may be positioned by a player (e.g., using a computer mouse). The position of the game pointer 128 may be used to determine, for example, a player input parameter such as an angular measurement associated with a swing of a golf club.

Referring again to FIG. 1A, at 114 it is determined that at least one set of possible input parameters to a physics simulation will produce a successful game result given the established game condition. For example, it may be determined that at least one possible position of the game pointer 128 (e.g., out of all 1024 by 768 possible computer display locations) will result in the simulated golf ball being propelled from the initial location 124 such that it rolls across the putting green terrain 122 and finally comes to rest within the simulated golf hole 126.

Figure 1C:
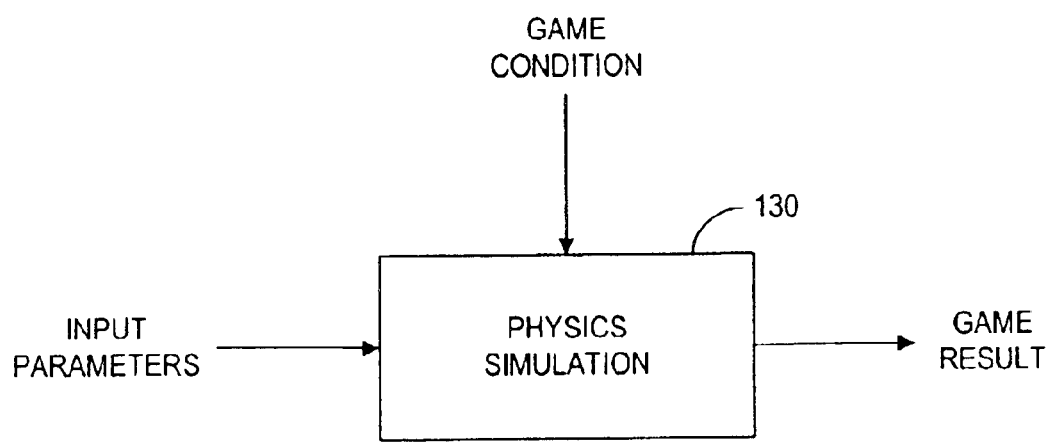
FIG. 1C is a flow diagram associated with a physics simulation according to an embodiment of the present invention.

FIG. 1C is a flow diagram associated with a physics simulation 130 according to an embodiment of the present invention. In particular, the physics simulation 130 generates a game result based on (i.e., based at least in past on) one or more game conditions and one or more input parameters. For example, the physics simulation 130 (e.g., a computer program) may calculate a trajectory of a simulated golf ball in accordance with one or more game conditions (e.g., a fairway layout, a three-dimensional putting green terrain, and/or a wind direction and wind velocity) and a set of player input parameters (e.g., a golf club type, a golf club velocity, and an angular measurement associated with a swing of a golf club). Based on the calculated trajectory, the game result can then be determined (e.g., a final destination of a simulated golf ball and/or whether or not the simulated golf ball came to rest within a simulated golf hole 126). Note that the physics simulation 130 may not be a "perfect" simulation of the real world. For example, one or more real-world parameters (e.g., wind resistance) may be ignored or approximated by the physics simulation 130.

Game System

Figure 2:
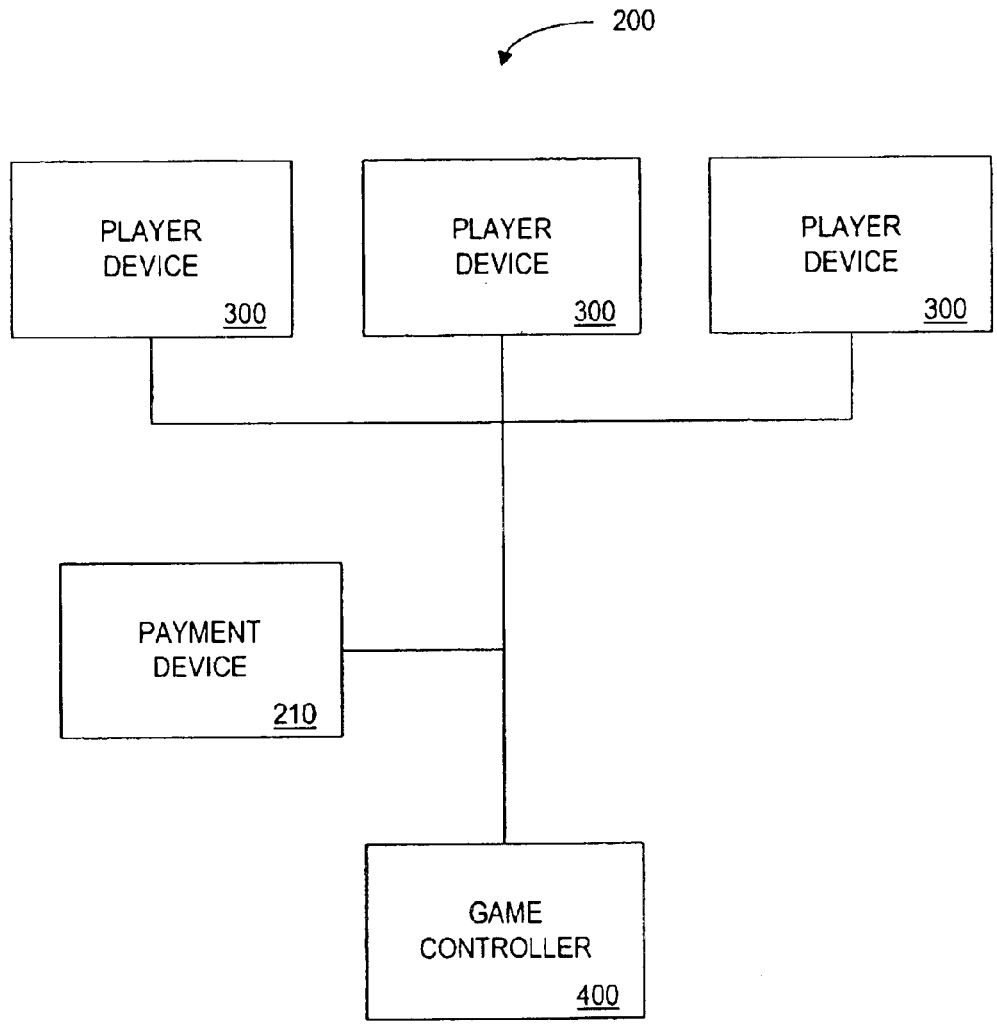
FIG. 2 is a block diagram overview of a game system according to an embodiment of the present invention.

FIG. 2 is a block diagram overview of a game system 200 according to one embodiment of the present invention. The game system 200 includes a game controller 400 in communication with a number of player devices 300. As used herein, devices (such as the player devices 300 and the game controller 400) may communicate, for example, via a communication network, such as a Local Area Network (LAN), a Metropolitan Area Network (MAN), a Wide Area Network (WAN), a Public Switched Telephone Network (PSTN), a Wireless Application Protocol (WAP) network, or an Internet Protocol (IP) network such as the Internet, an intranet or an extranet. Moreover, as used herein, communications include those enabled by wired or wireless technology. Note that although a single game controller 400 is shown in FIG. 2, any number of game controllers 400 may be included in the game system 200. Similarly, any number of the other devices described herein may be included in the game system 200 according to embodiments of the present invention.

In one embodiment of the present invention, a player device 300 communicates with a remote, Web-based game controller 400 (e.g., a server) via the Internet. Although some embodiments of the present invention are described with respect to information exchanged using a Web site, according to other embodiments information can instead be exchanged, for example, via: a telephone, an Interactive Voice Response Unit (IVRU), electronic mail, a WEBTV® interface, a cable network interface, and/or a wireless communication system.

The player device 300 and the game controller 400 may be any device capable of performing various functions described herein. The player device 300 may be, for example: a Personal Computer (PC), a portable computing device such as a Personal Digital Assistant (PDA), a wired or wireless telephone, a one-way or two-way pager, a kiosk (e.g., a game kiosk located at an airport terminal), a game terminal (e.g., a SONY PLAY STATIONS ® video game terminal), or any other appropriate storage and/or communication device.

Note that the devices shown in FIG. 2 need not be in constant communication. For example, the player device 300 may only communicate with the game controller 400 via the Internet when appropriate (e.g., when attached to a "docking" station or "cradle" coupled to the player's PC). The player device 300 may also communicate with the game controller 400 via an infrared device when near a game kiosk. Note also that a player device 300 and the game controller 400 may be incorporated in a single device (e.g., a game kiosk may act as both a player device 300 and the game controller 400).

According to an embodiment of the present invention, a player uses a player device 300 to communicate with the game controller 400. For example, a player may use his or her PC to access a Web site associated with the game controller 400 in order to play a game.

The game played by the player is associated with a physics simulation. For example, the game may use a physics model associated with propelling a simulated object, and a successful game result may comprise the simulated object reaching a predetermined destination or goal location. One example of such a game is a computer-based golf game (e.g., a golf driving simulation or a golf putting simulation) in which a player attempts to propel a simulated golf ball such that it comes to rest within a simulated golf hole. Other types of games associated with propelling a simulated object include, for example, a baseball game, a basketball game, a football game, a soccer game, a hockey game, a bowling game, a billiards game, a throwing game (e.g., a dart throwing game), and a shooting game. Note that the game does not need to be a sports game. For example, a ring-toss game, a skee-ball game, a pinball game, an aircraft simulation, or a space-based game (e.g., in which a player maneuvers a spacecraft) can be associated with a physics simulation. A game in which a player attempts to "catch" a simulated object (e.g., by catching a baseball) can also be associated with a physics simulation.

As described with respect to FIG. 1C, the physics simulation is adapted to generate one or more game results based on a set of input parameters. In the case of a golf game, the game result may indicate whether or not a simulated golf ball has come to rest within a simulated golf hole. In general, a "game result" may include any information associated with the play of a game, such as a determination of whether or not a player has won a game, whether or not a player has won a prize, and/or an amount of a prize won by a player.

According to an embodiment of the present invention, the game controller 400 establishes one or more game conditions. For example, the game controller 400 may establish a game condition associated with a particular game to be played by a player. According to another embodiment, the game controller 400 establishes a game condition that will be associated with a plurality of games (e.g., a plurality of games played by one or more players). In the case of a computer-based golf game, examples of game conditions include a terrain feature (e.g., a contour, a three-dimensional putting green terrain, or a fairway layout), a wind direction and a wind velocity, a friction parameter (e.g., a friction associated with an area in the "rough"), a golf ball location (e.g., an initial tee position), and/or a golf hole location.

The game controller 400 then determines that at least one set of possible input parameters to the physics simulation will produce a successful game result given the established game condition. In this way, the player can be assured that he or she does in fact have a chance of winning the game (e.g., assuming he or she provides the appropriate input parameters via the game system 200).

The game controller 400 can make this determination in a number of ways. Consider a game associated with propelling a simulated object. In such a game, a successful game result may involve the simulated object reaching a predetermined destination. According to one embodiment of the present invention, the game controller 400 places the simulated object at a first location and propels the simulated object in accordance with a set of possible input parameters. The game controller 400 then determines a second location of the simulated object based on the physics simulation and the established game condition (e.g., after calculating a trajectory for the simulated object). The first location can then be used as an initial location for the simulated object and the second location can be used as the predetermined destination. Note that depending on the physics simulation, the initial location may not need to be set exactly equal to the first location. That is, the initial location may instead be based on the first location (e.g., may be within a predetermined distance of the first location). Similarly, the predetermined destination may be based on the second location.

According to another embodiment, the second location is used to generate the initial location for the simulated object and the first location is used to generate the predetermined destination. Such an approach may be appropriate, for example, in a golf putting game where the putting green is flat.

For example, in a computer-based golf game, a successful result may involve having a simulated golf ball come to rest within a simulated golf hole (e.g., a player may win a prize if he shoots a hole-in-one). In this case, the game controller 400 may select an initial position for the simulated golf ball (e.g., a tee location). The game controller 400 may then select a possible location of a pointer on a display device (e.g., by selecting a location from a set of 1024 by 768 possible locations), and determine an input parameter (e.g., an angular measurement associated with a swing of a golf club) based on the selected location. This input parameter is used to perform a "test" shot of the golf ball via the physics model to determine a destination where the simulated golf ball comes to rest (or when the simulated golf ball's velocity slows below a predetermined threshold). The golf hole can then be located at this destination, ensuring that if the player positions the pointer at the same location that was selected by the game controller 400, he or she will produce a successful game result.

Another way for the game controller 400 to determine that at least one possible set of input parameters will produce a successful game result is to select a potential initial location and a potential predetermined destination, A test calculation may the be performed to determine if a set of possible input parameters to the physics simulation will propel the simulated object from the potential initial location to the potential predetermined destination. If such a set of possible input parameters exists, the potential initial location and the potential predetermined destination can be used in the game. If no such set of possible input parameters exists, the potential initial location and/or the potential predetermined destination are adjusted or re-selected and another test calculation is performed.

According to another embodiment, the game controller 400 selects an initial location and performs a calculation to generate an appropriate destination for a game such that a set of possible input parameters to the physics simulation will propel the simulated object from the initial location to that destination. Similarly, the game controller 400 can instead first select the destination and then calculate an appropriate initial location.

According to still another embodiment, the game controller 400 selects an initial location and generates a list of appropriate predetermined destinations, such that for each appropriate predetermined destination a set of possible input parameters will propel the simulated object from the initial location to the predetermined destination. In this case, the game controller 400 then simply selects one of the appropriate predetermined destinations for use in a game. Similarly, the game controller 400 can select a predetermined destination and generate a list of appropriate initial locations. In another embodiment, the initial location and predetermined locations are selected, and the game controller 400 calculates a game condition (e.g., a wind direction and a wind velocity) such that at least one set of possible input parameters to the physics simulation will produce a successful game result.

After determining that at least one set of possible input parameters to the physics simulation will produce a successful game result, the game controller 400 arranges for the player to play the game. For example, the player may use his or her player device 300 to generate and transmit a set of player input parameters to the game controller 400. In the case of a computer-based golf game, the player input parameters may include, for example, a golf ball velocity, a golf ball angular measurement, a golf ball rotation, a golf ball location, a golf club velocity, a golf club angular measurement, a golf club location, a golf club type, an aiming direction, and/or an aiming location.

The game controller 400 then determines a game result based on the received player input parameters, the game condition, and the physics simulation. In the case of a computer-based golf game, the game result may comprise, for example, a distance between a golf ball and a golf hole, whether the golf ball comes to rest within the golf hole, and/or a number of strokes that were required to place the golf ball within the golf hole. The game controller 400 can then transmit an indication associated with the game result to the player device 300.

According to one embodiment, the game controller 400 also arranges for the player to provide a payment in exchange for playing the game and/or arranges for the player to receive a payment if the determined game result has a predetermined relationship to the successful game result. For example, the game controller 400 may arrange for the player to receive $1,000 if he or she shoots a hole-in-one in a computer-based golf game. Note that a payment device 210 may be used to arrange for the player to provide or receive payments. For example, the game controller 400 may arrange for a player to purchase one or more game plays via the payment device 210 (e.g., via a credit card account, a debit card account, a banking account, or an electronic payment protocol).

Player Device

Figure 3:
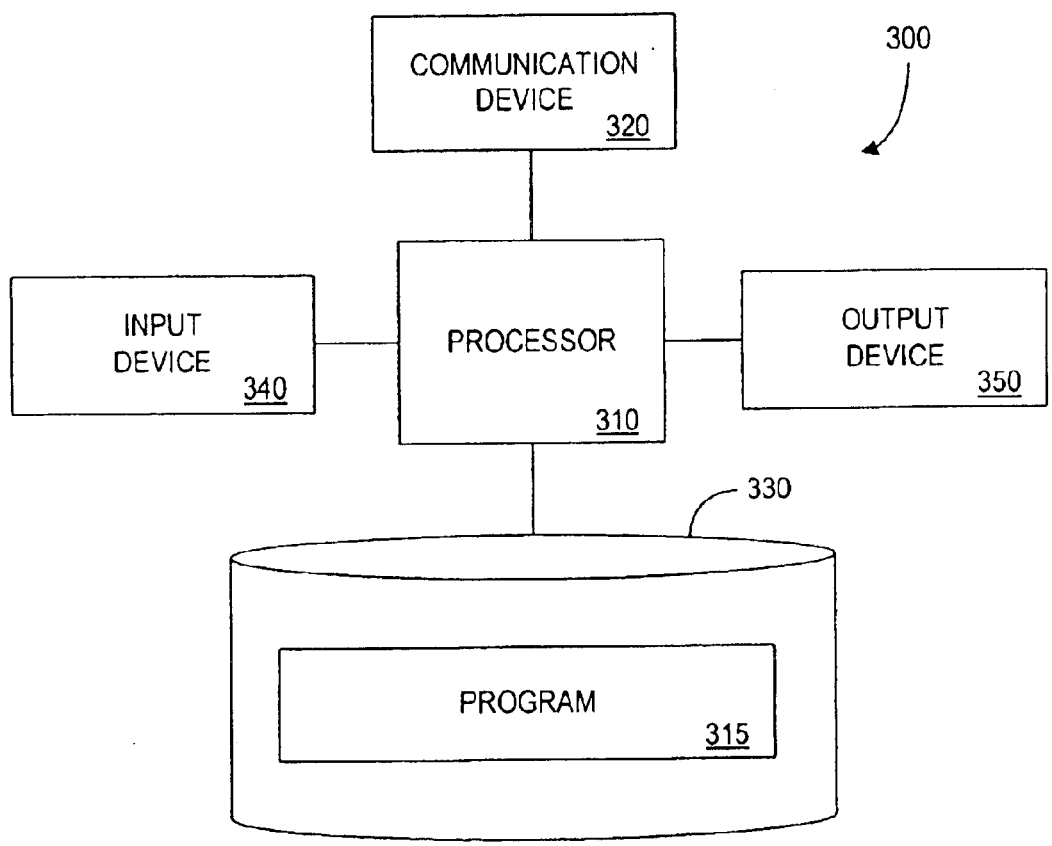
FIG. 3 is a block diagram of a player device according to an embodiment of the present invention.

FIG. 3 illustrates a player device 300 that is descriptive of the device shown in FIG. 2, according to an embodiment of the present invention. The player device 300 comprises a processor 310, such as one or more INTEL® Pentium® processors, coupled to a communication device 320 configured to communicate via a communication network (not shown in FIG. 3). The communication device 320 may be used to communicate, for example, with the game controller 400.

The processor 310 is also in communication with an input device 340. The input device 340 may comprise, for example, a keyboard, a mouse or other pointing device, a microphone, a knob or a switch (including an electronic representation of a knob or a switch), an infrared port, a docking station, and/or a touch screen. Such an input device 340 may be used, for example, by a player to play a game involving a physics simulation (e.g., by manipulating a pointer associated with a computer-based golf game).

The processor 310 is also in communication with an output device 350. The output device 340 may comprise, for example, a display (e.g., a computer monitor), a speaker, and/or a printer. The output device 350 may be used, for example, to display an indication associated with a game result to a player.

The processor 310 is also in communication with a storage device 330. The storage device 330 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 330 stores a program 315 for controlling the processor 310. The processor 310 performs instructions of the program 315, and thereby operates in accordance with the present invention. For example, the processor 310 may generate one or more player input parameters associated with a game.

The program 315 may be stored in a compressed, uncompiled and/or encrypted format. The program 315 may furthermore include other program elements, such as an operating system, a database management system, and/or "device drivers" used by the processor 310 to interface with peripheral devices. Such program elements are known to those skilled in the art.

As used herein, information may be "received" by or "transmitted" to, for example: (i) the player device 300 from the game controller 400; or (ii) a software application or module within the player device 300 from another software application, module, or any other source.

Figure 11A:
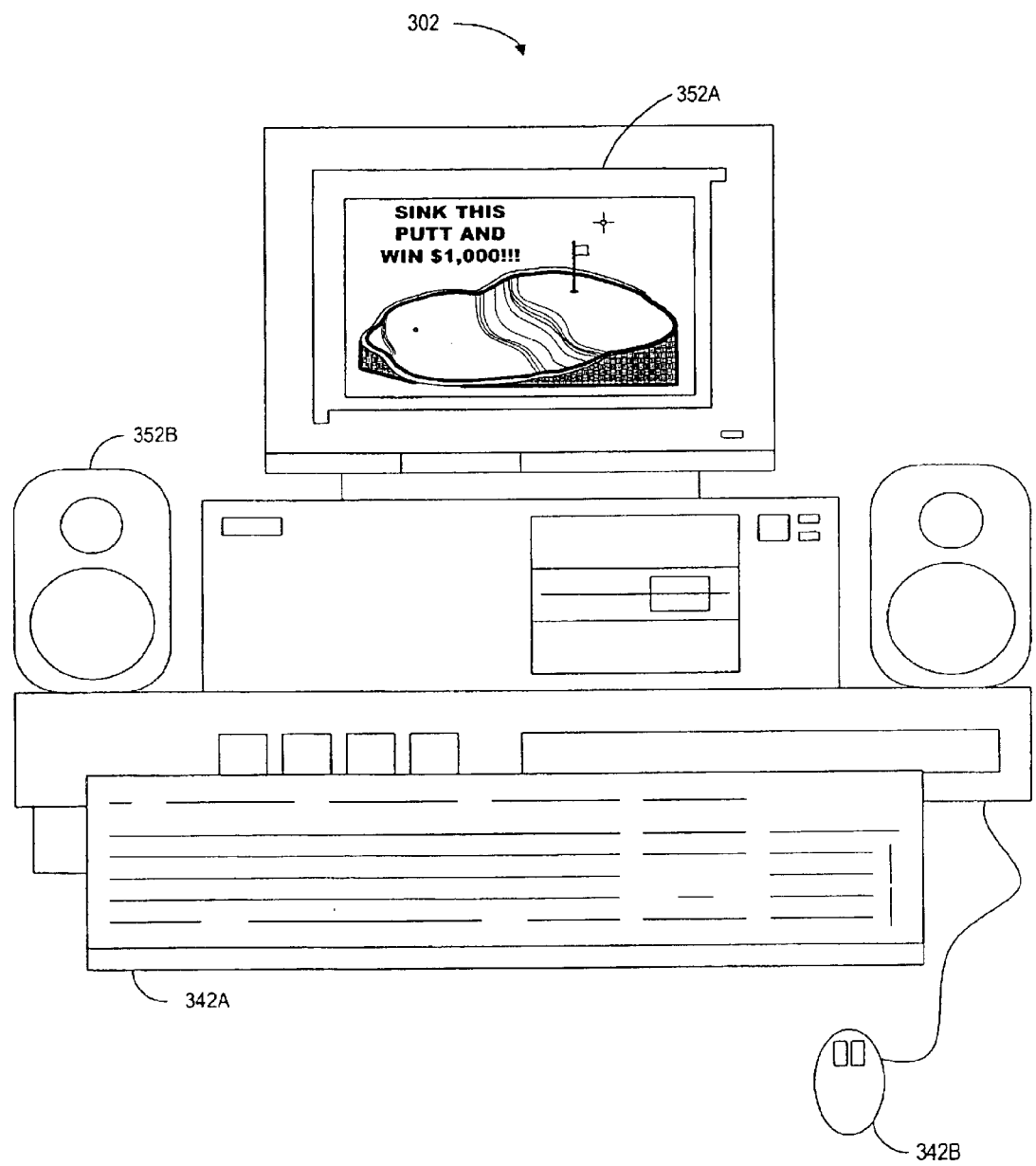
FIGS. 11A through 11C illustrate player devices displaying game information according to some embodiments of the present invention.

FIG. 11A illustrates a PC 302 displaying game information according to an embodiment of the present invention. The PC 302 includes a keyboard 342A and a mouse 342B which can be used by a player to generate player input parameters. The PC 302 also includes a computer display 352A and speakers 352B which can be used to indicate a game result to the player.

Figure 11B:
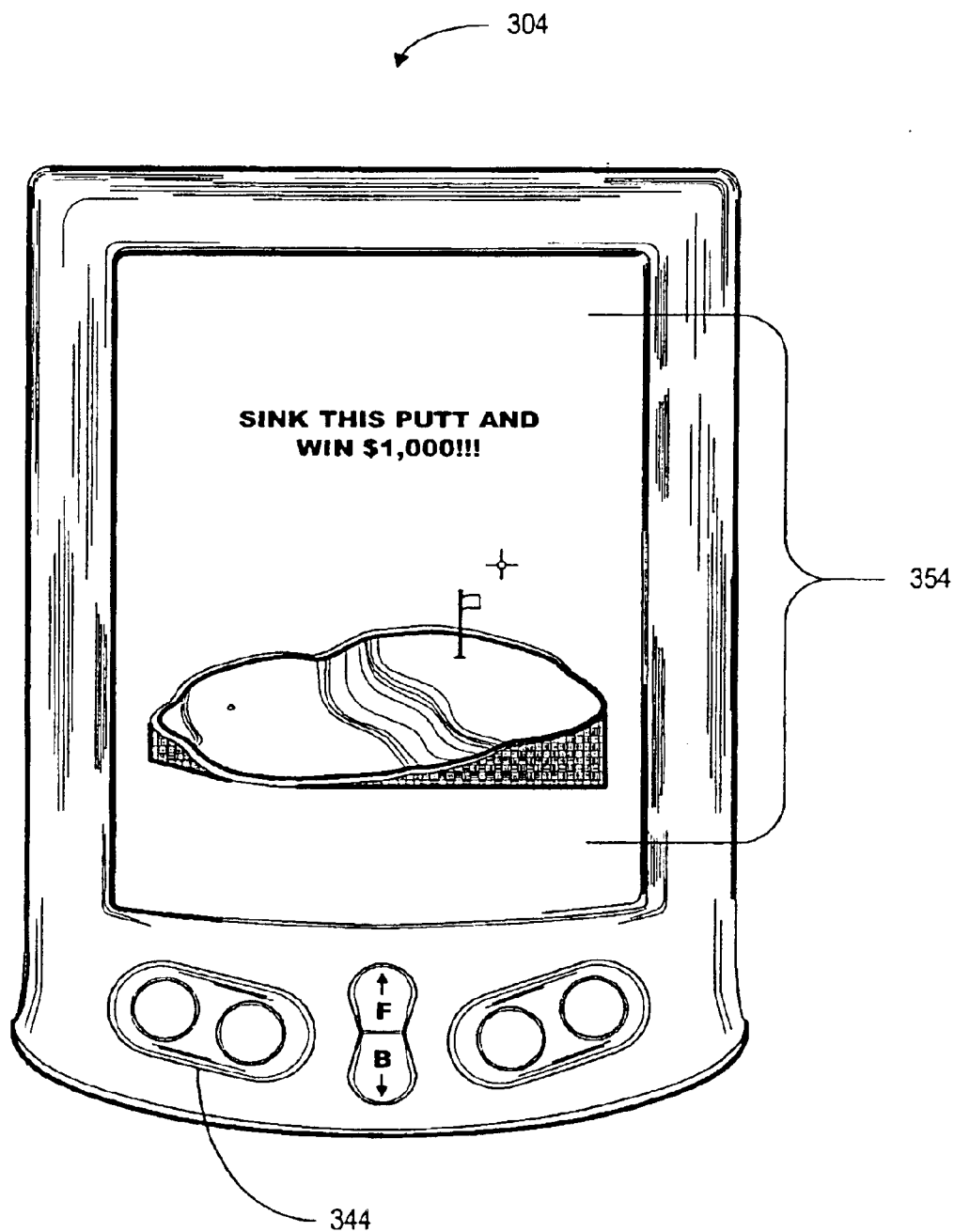
Figure 11C:
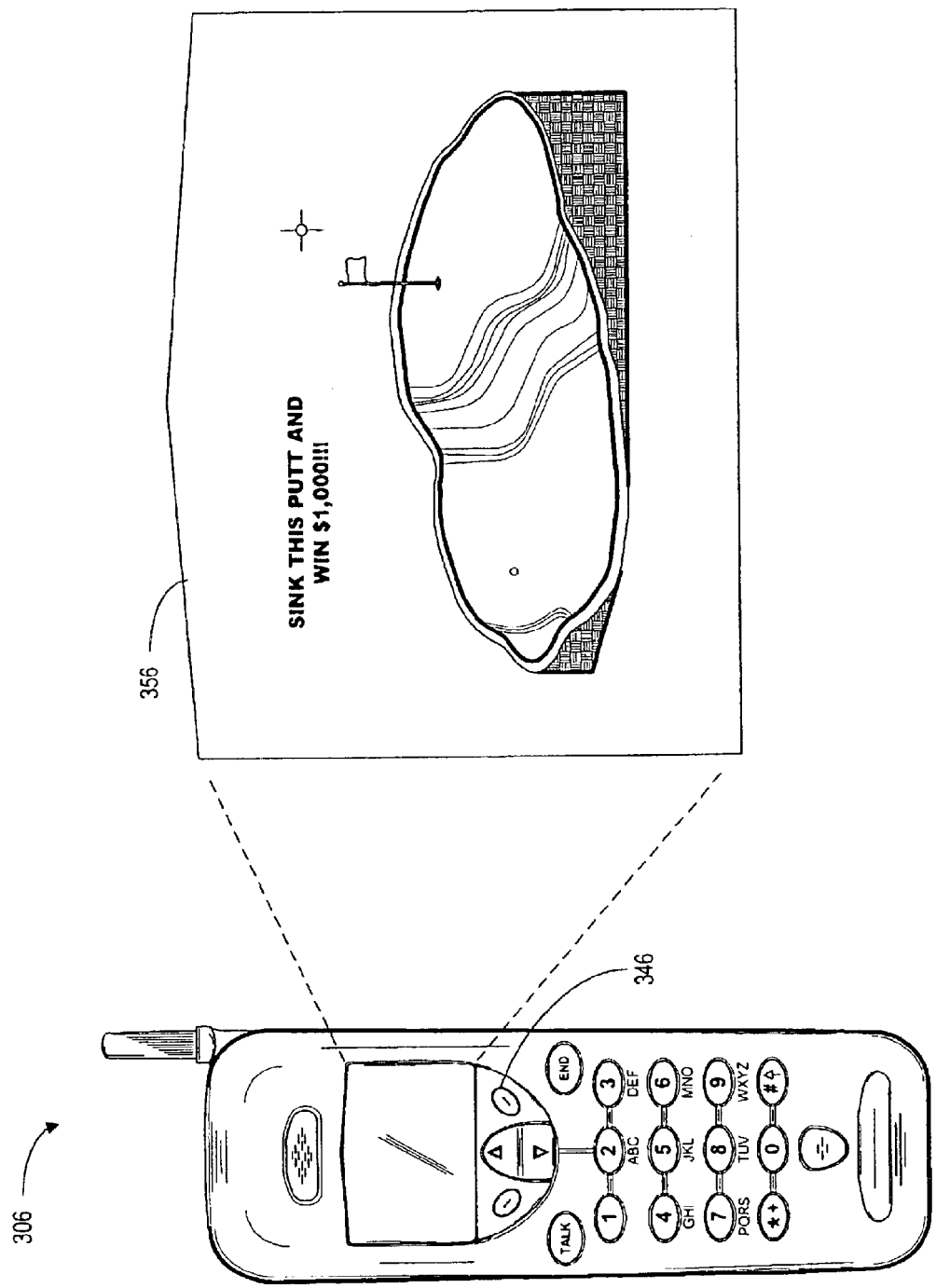

FIG. 11B illustrates a PDA 304 displaying game information according to another embodiment of the present invention. The PDA 304 includes an input device 344 and an output device 354 (e.g., a display screen) that may be used by a player to play a game. Similarly, FIG. 11C illustrates a wireless telephone 306 including an input device 346 and an output device 356.

Game Controller

Figure 4:
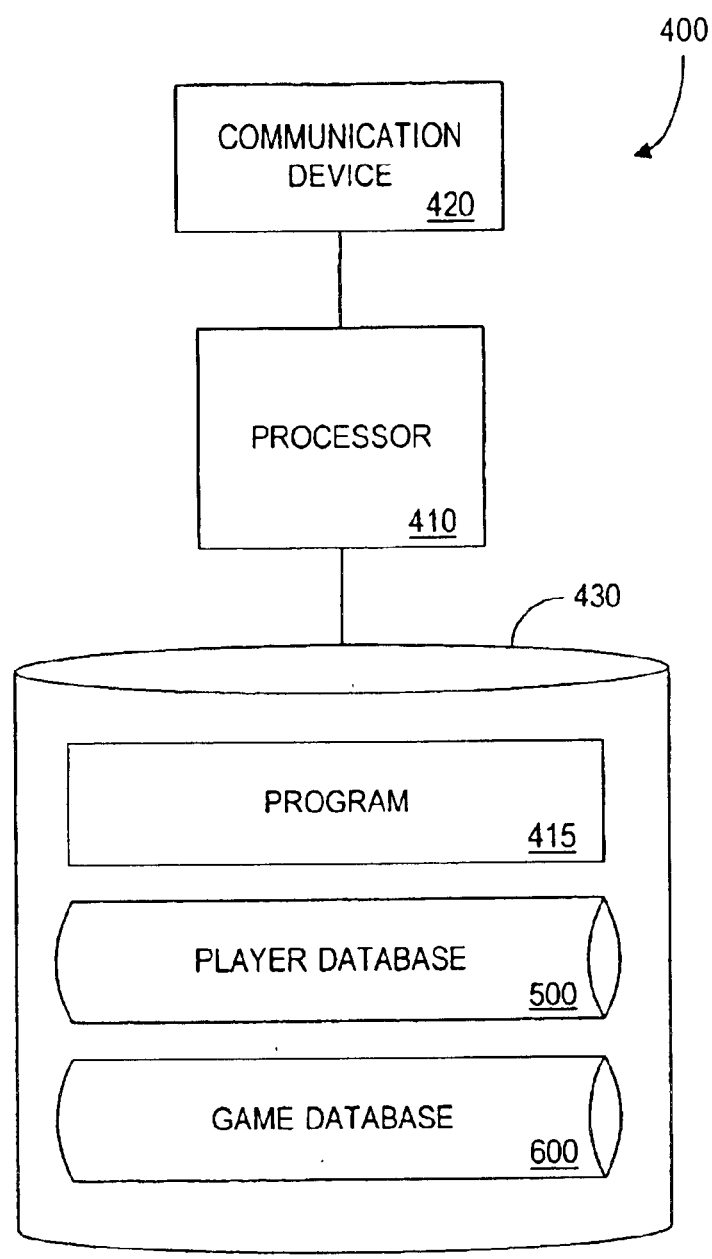
FIG. 4 is a block diagram of a game controller according to an embodiment of the present invention.

FIG. 4 illustrates a game controller 400 that is descriptive of the device shown in FIG. 2, according to an embodiment of the present invention. The game controller 400 comprises a processor 410, such as one or more INTEL® Pentium® processors, coupled to a communication device 420 configured to communicate via a communication network (not shown in FIG. 4). The communication device 420 may be used to communicate, for example, with the player device 300.

The processor 410 is also in communication with a storage device 430. The storage device 430 may comprise any appropriate information storage device, including combinations of magnetic storage devices (e.g., magnetic tape and hard disk drives), optical storage devices, and/or semiconductor memory devices such as RAM devices and ROM devices.

The storage device 430 stores a program 415 for controlling the processor 410. The processor 410 performs instructions of the program 415, and thereby operates in accordance with the present invention. For example, the processor 410 may establish a game condition and determine that at least one set of possible input parameters to the physics simulation will produce a successful game result given the established game condition.

According to another embodiment, the processor 410 establishes a golf game condition and determines that at least one set of possible input parameters to a golf simulation will produce a successful game result given the established golf game condition. The processor 410 may also arrange for a player to provide a payment in exchange for playing the golf game and receive a set of player input parameters from a remote player device 300. The processor 410 can then determine a game result based on the received player input parameters, the golf game condition, and the golf simulation. For example, the golf game may involve hitting a simulated golf ball and the game result may comprise the simulated golf ball reaching a destination. The processor 410 can also transmit an indication associated with the game result to the remote player device 300 and arrange for the player to receive a payment if the destination of the simulated golf ball is within a predetermined distance of a simulated golf hole.

The program 415 may be stored in a compressed, uncompiled and/or encrypted format. The program 415 may furthermore include other program elements, such as an operating system, a database management system, and/or device drivers used by the processor 410 to interface with peripheral devices.

As used herein, information may be "received" by or "transmitted" to, for example: (i) the game controller 400 from the player device 300; or (ii) a software application or module within the game controller 400 from another software application, module, or any other source.

As shown in FIG. 4, the storage device 430 also stores a player database 500 (described with respect to FIG. 5) and a game database 600 (described with respect to FIG. 6).

Examples of databases that may be used in connection with the game system 200 will now be described in detail with respect to FIGS. 5 and 6. The illustrations and accompanying descriptions of the databases presented herein are exemplary, and any number of other database arrangements could be employed besides those suggested by the figures.

Player Database

Referring to FIG. 5, a table represents the player database 500 that may be stored at the game controller 400, according to an embodiment of the present invention. The table includes entries identifying players who may play games via the game system 200. The table also defines fields 502, 504, 506, 508, 510 for each of the entries. The fields specify: a player identifier 502, a name 504, contact information 506, payment information 508, and an account balance 510. The information in the player database 500 may be created and updated, for example, based on information received from player when he or she registers with the game controller 400. The information in the player database 500 may also be based on, for example, information generated as the player plays games via the game system 200.

The player identifier 502 may be, for example, an alphanumeric code associated with a player who has registered to use the game system 200. The player identifier 502 may be generated by, for example, the game controller 400 or the player (e.g., when the player provides a user name and password). The player database 500 also stores the name 504 and contact information 506 (e.g., a postal address, an electronic mail address, an IP address, or a telephone number) associated with each player.

The payment information 508 may comprise, for example, a credit card, debit card or bank account number (e.g., a checking account number) or digital payment protocol information. The account balance 510 may represent an amount that a player owes to a game provider or an amount that the game provider owes to the player. The payment information 508 and account balance 510 may be used, for example, by the game controller 400 to arrange for the player to provide or receive a payment.

Game Database

Referring to FIG. 6, a table represents the game database 600 that may be stored at the game controller 400, according to an embodiment of the present invention. According to another embodiment, all or some of the information in the game database 600 may instead be stored at a player device 300. The table includes entries identifying games that have been played via the game system 200. The table also defines fields 602, 604, 606, 608, 610, 612 for each of the entries. The fields specify: a game identifier 602, a player identifier 604, a game type 606, one or more game conditions 608, one or more player input parameters 610, and a game result 612. The information in the game database 600 may be created and updated, for example, as players play games.

The game identifier 602 may be, for example, an alphanumeric code associated with a game that was played via the game system 200. The player identifier 604 indicates the player who played the game, and may be based on, or associated with, the player identifier 502 stored in the player database 500. The game type 606 represents the type of game that was played by the player (e.g., a golf putting type of game or a basketball type of game).

The game conditions 608 represent one or more game conditions generated by, or used by, the game controller 400. The game conditions 608 may be associated with a particular game or may be used in a plurality of games. The player input parameters 610 represent one or more values based on information received from the player device 300 during play of the game. The game controller 400 then uses a physics simulation to generate the game result 612 based on the game conditions 608 and the player input parameters 610. The game result 612 may indicate, for example, a position of a simulated object and/or an amount that has been won by the player during the game.

Methods that may be used in connection with the game system 200 according to some embodiments of the present invention will now be described in detail with respect to FIGS. 7 through 10.

Game System Methods

Figure 7:
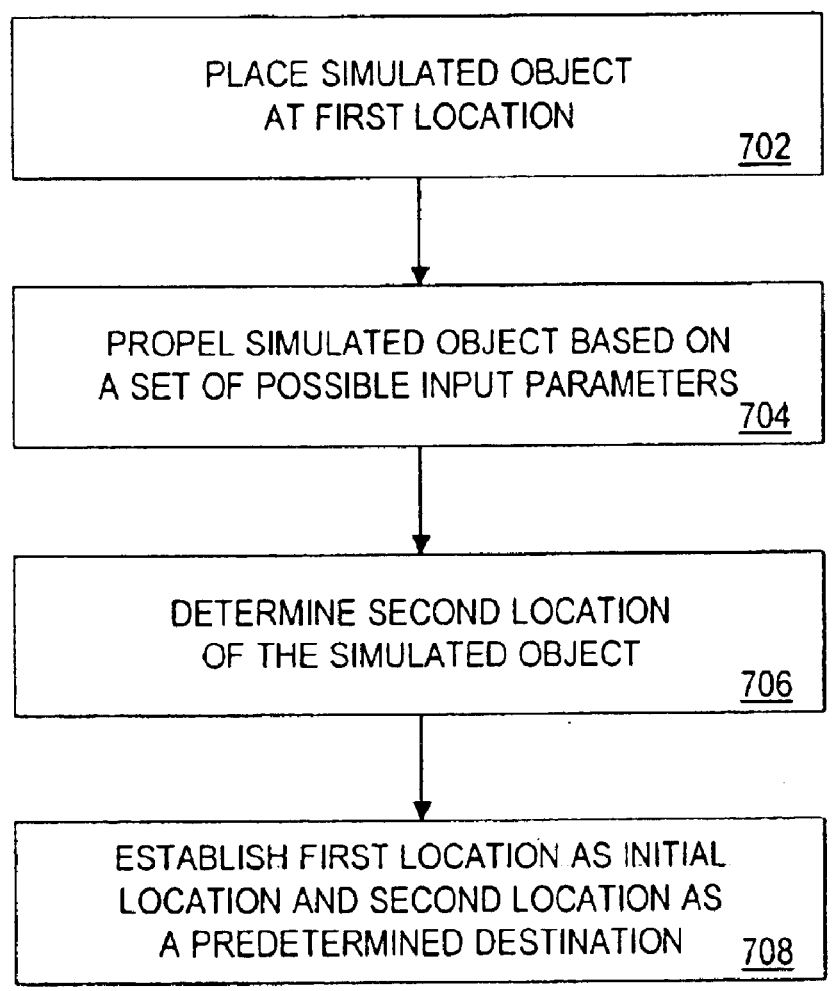
FIG. 7 is a flow chart of a method for determining an initial location and a predetermined destination according to an embodiment of the present invention.

FIG. 7 is a flow chart of a method for determining an initial location and a predetermined destination that may be performed by the game controller 400 according to an embodiment of the present invention. The flow chart in FIG. 7, as well as the other flow charts discussed herein, does not imply a fixed order to the steps, and embodiments of the present invention can be practiced in any order that is practicable. Moreover, the methods may be performed by any device described herein, including a player device 300.

The method associated with FIG. 7 is directed to a game in which a player propels a simulated object from an initial location, and a successful game result comprises the simulated object reacting a predetermined destination. One example of such a game is a computer-based golf game in which a player propels a simulated golf ball and attempts to have the simulated golf ball come to rest within a simulated golf hole.

At 702, a simulated object is placed at a first location. For example, a tee location may be randomly determined for a simulated golf ball. At 704, the simulated object is propelled based on a set of possible input parameters. For example, the game controller 400 may randomly select a set of possible input parameters (i.e., a set of input parameters capable of being generated by the player or a player device 300) and use those parameters with a physics simulation to calculate a trajectory of a simulated golf ball.

At 706, a second location of the simulated object is determined. For example, the game controller 400 may calculate where the simulated golf ball comes to rest. At 708, the first location is established as an initial location for a game (i.e., the initial location is based at least in part on first location) and the second location is established as a predetermined destination (i.e., the predetermined destination is based at least in part on the second location). In the case of a computer-based golf game, the game controller 400 may, for example, place a simulated golf hole at the second location.

In this way, the game controller 400 can ensure that at least one set of possible input parameters to the physics simulation will produce a successful game result (e.g., will result in the simulated object reaching the predetermined destination).

Figure 8:
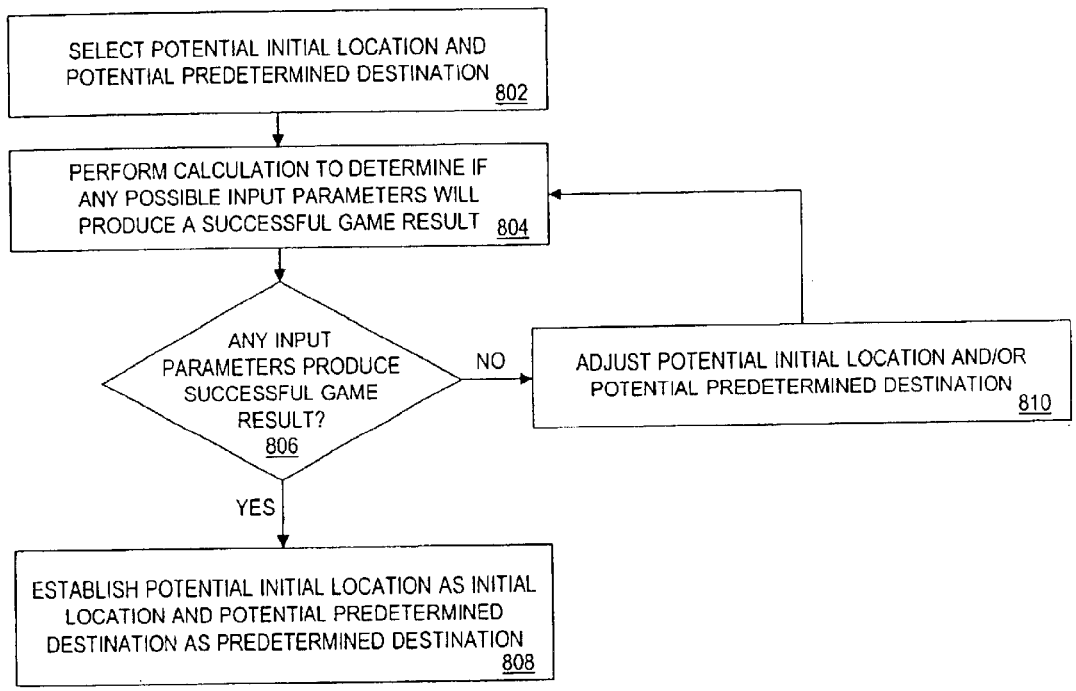
FIG. 8 is a flow chart of a method for determining an initial location and a predetermined destination according to another embodiment of the present invention.

FIG. 8 is a flow chart of a method for determining an initial location and a predetermined destination according to another embodiment of the present invention. At 802 a potential initial location and a potential predetermined destination are selected. For example, the game controller 400 may randomly generate the potential initial location and the potential predetermined destination.

At 804, a calculation is performed to determine if any set of possible input parameters will produce a successful game result. For example, the game controller 400 may generate every possible set of input parameters, or may adjust a potential set of input parameters (e.g., based on a game result associated with a prior potential set of input parameters), and test those input parameters with the physics simulation to determine if any set of possible input parameters will produce a successful game result.

If a set of possible input parameters exists to produce a successful game result at 806, the potential initial location is established as the initial location and the potential predetermined destination at 808. For example, the game controller 400 may establish the potential initial location as a simulated golf tee and the potential predetermined destination as a simulated golf hole. If no set of possible input parameters exists to produce a successful game result at 806, the potential initial location and/or the potential predetermined destination are adjusted at 810. The calculation described with respect to 804 can then be performed again.

Figure 9A:
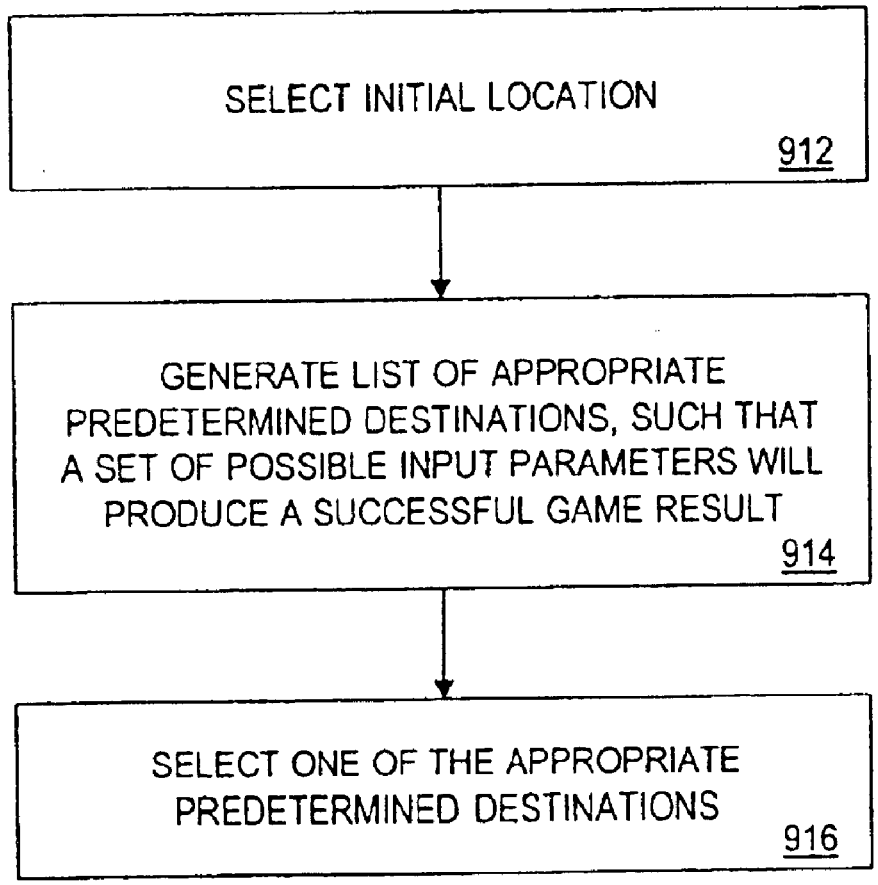
FIG. 9A is a flow chart of a method for determining appropriate predetermined destinations according to an embodiment of the present invention.

FIG. 9A is a flow chart of a method for determining appropriate predetermined destinations according to an embodiment of the present invention. At 912, an initial location is selected. For example, the game controller 400 may randomly select a location associated with a simulated golf tee. According to another embodiment, the game controller 400 "selects" the position of the simulated golf tee by retrieving a predetermined location (e.g., a location associated with a particular simulated fairway).

At 914, a list of appropriate predetermined destinations are generated such that a set of possible input parameters exist for each appropriate predetermined destination to produce a successful game result. For example, the game controller 400 may use a physics simulation to generate the list of appropriate simulated golf hole locations based on a simulated golf tee location and wind conditions (e.g., a wind direction and a wind velocity).

Figure 9B:
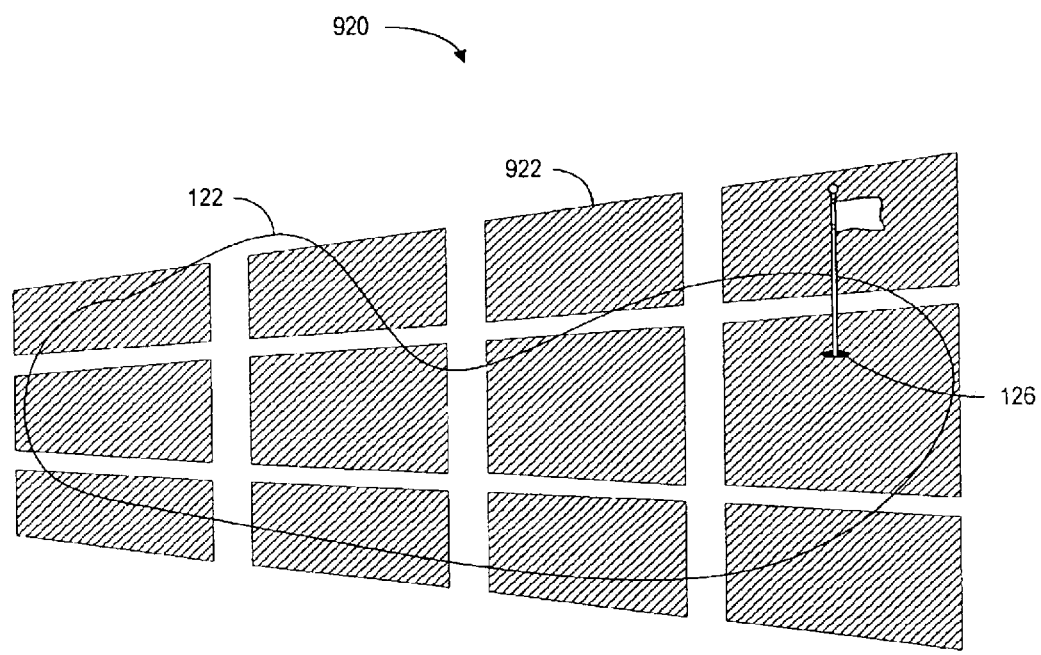
FIG. 9B illustrates appropriate predetermined destinations according to the embodiment of the present invention described with respect to FIG. 9A.

FIG. 9B illustrates appropriate predetermined destinations according to the embodiment of the present invention described with respect to FIG. 9A. In particular, game information 920 includes a putting green 122 and a simulated golf hole 126. Based on a simulated golf tee location (not shown in FIG. 9B) and wind conditions, the game controller 400 generated a list of appropriate areas 922 in accordance with a physics simulation. That is, a set of possible player input parameters (e.g., a pointer location on a player's PC) exist such that a simulated golf ball hit from the simulated golf tee may come to rest (or may slow below a predetermined threshold velocity) within the appropriate areas 922. As long as the simulated golf hole 126 is located within one of the appropriate areas 922, it will be possible for a player to shoot a hole-in-one. If, however, the simulated golf hole 126 is not located within one of the appropriate areas 922, it would be impossible for the player to shoot a hole-in-one given the simulated golf tee location and wind conditions.

Referring again to FIG. 9A, one of the appropriate predetermined destinations can then be selected and used in a game. For example, the game controller 400 may select one of the appropriate predetermined destinations as a simulated golf hole location.

Figure 10:
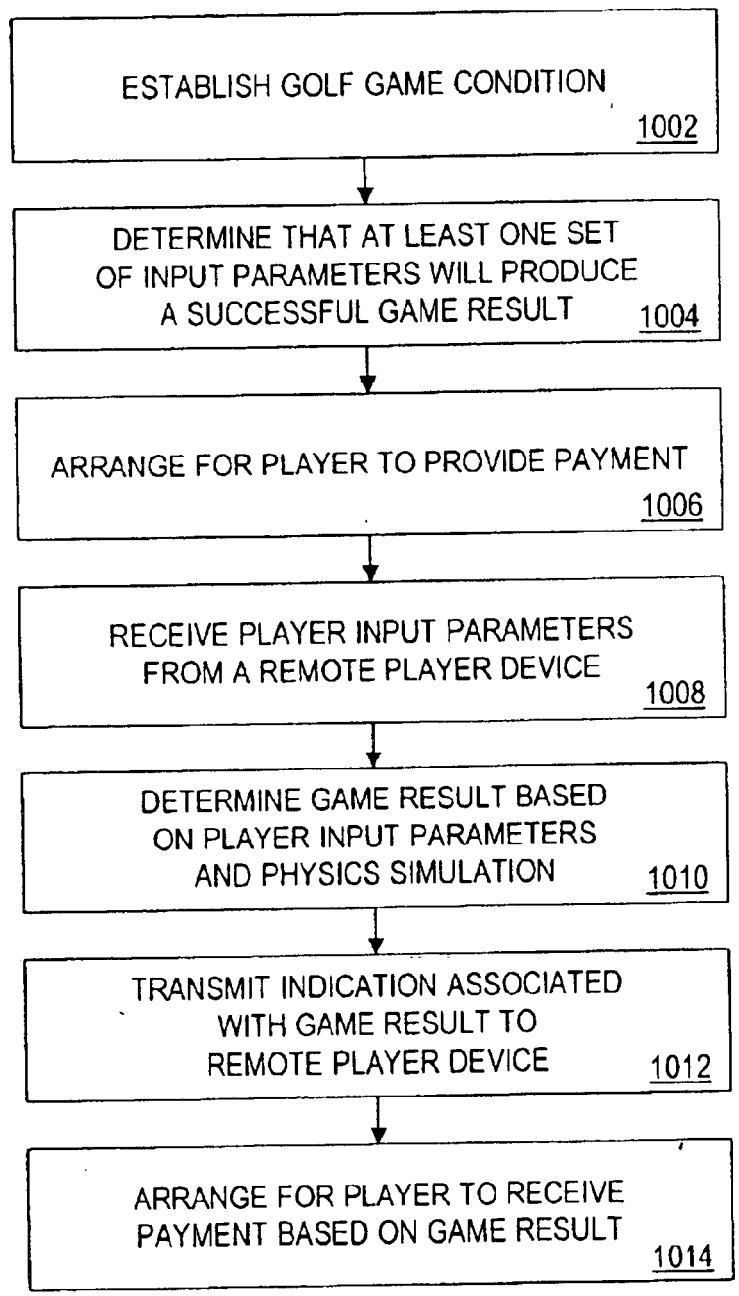
FIG. 10 is a flow chart of a method for conducting a golf game according to an embodiment of the present invention.

FIG. 10 is a flow chart of a method for conducting a golf game according to an embodiment of the present invention. At 1002, the game controller 400 establishes a golf game condition, such as by generating a three-dimensional putting green terrain. The golf game condition may be stored, for example, in the game database 600.

At 1004, the game controller 400 determines that at least one set of possible input parameters to a physics simulation will produce a successful game result (e.g., a hole-in-one). This may done, for example, in any of the ways described with respect to FIGS. 7, 8, and 9A.

The game controller 400 arranges for the player to provide a payment at 1006. For example, the game controller 400 may transmit payment information 508 stored in the player database 500 to the payment device 210 to arrange for the player to provide a $5 payment in exchange for twenty game plays.

The game controller 400 then receives player input parameters from a remote player device 300 at 1008. For example, the player may use a computer mouse to position a pointer on a display, and when the player clicks a button on the computer mouse a signal associated with the pointer location can be sent from the player device 300 to the game controller 400.

At 1010, a game result is determined based on the received player input parameters and the physics simulation. For example, the game controller 400 may calculate the trajectory of a simulated golf ball and determine whether or note the simulated golf ball comes to rest within a simulated golf hole.

The game controller 400 transmits an indication with the game result to the remote player device 300 at 1012 and arranges for the player to receive a payment (e.g., a prize) based on the game result at 1014. Of course, if the player does not win the game no payment may be provided to the player at 1014.

Additional Embodiments

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although most of the embodiments described herein are associated with a game controller 400 establishing a game condition and/or determining that at least one set of possible input parameters will produce a successful game result, either of these functions may instead be performed by a player device 300.

Similarly, although most of the embodiments described herein are associated with a game played by a single player, the present invention can also be used with respect to a game involving multiple players. For example, the first player to shoot a hole-in-one may receive payment of a prize amount. In addition, embodiments of the present invention may or may not involve players who provide payments in exchange for playing the game (e.g., a sweepstakes-type prize may be awarded to a player).

Many of the embodiments described herein are associated with a physics simulation in which a simulated object is propelled through space. According to other embodiments, the physics simulation may instead involve, for example, time or temperature. Similarly, other embodiments may be directed to other types of computer-based simulations (e.g., simulations of an urban environment or a financial market). Moreover, embodiments of the present invention may involve pure games of skill, pure games of chance, and/or games associated with both skill and chance.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of providing game play comprising:
   providing a game associated with a physics simulation.
      wherein the physics simulation is adapted to generate a game result, and
      wherein the game result is a function of a set of game conditions and a single set of input parameters;
   determining a first set of game conditions;
   determining existence of a first single set of input parameters that would result in a successful game result given the first set of game conditions;
   altering the first set of game conditions if said determining existence results in that a first single set of input parameters does not exist that would result in a successful game result given the altered first set of game conditions;
   initiating game play once the existence of a first single set of input parameters that would result in a successful game result given the first set of game conditions has been determined;
   receiving a second single set of input parameters from a player;
   receiving an indication from the player that all input parameters of the single set of input parameters have been entered;
   terminating game play; and
   determining if the second single set of input parameters from the player results in a successful game result given the first set of game conditions.

2. The method of claim 1 wherein determining a first set of game conditions includes:
   determining a third single set of input parameters; and
   determining the first set of game conditions based on the third single set of input parameters as being defined as resulting in a successful game result.

3. (Currently Amended) A method comprising:
   determining a tee location, a wind speed, and a wind direction for a golf simulation game;
   generating a first club value and a first swing direction;
   determining a hole location based upon the tee location, the wind speed, the wind direction, the first club value, and the first swing direction; and initiating game play by displaying a representation of the hole location; receiving a second club value and a second swing direction from a player;

determining a ball location based upon the tee location, the wind speed, the wind direction, the second club value, and the second swing direction; and determining a game result based on the ball location and the hole location.

4. A method comprising:

generating a first game condition for a physics simulation game;

generating an first input parameter;

determining a second game condition based on the first game condition and the first input parameter;

receiving a second input parameter from a player;

determining a game result based upon the second input parameter, the first game condition, and the second game condition, wherein the physics simulation game is associated with propelling a simulated object from an initial location, a successful game result comprises the simulated object reaching a predetermined destination, and determining a second game condition comprises:

selecting a potential initial location and a potential predetermined destination; and performing a calculation to determine if a set of possible input parameters to the physics simulation will propel the simulated object from the potential initial location to the potential predetermined destination; and if the calculation determines that no set of possible input parameters to the physics simulation will propel the simulated object from the potential initial location to the potential predetermined destination, adjusting at least one of the potential initial location and the potential predetermined destination.

5. The method of claim 4, wherein the first game condition is generated in association with a particular game to be played by the player.

6. The method of claim 4, further comprising:

arranging for the player to play the physics simulation game in accordance with the second game condition.

7. The method of claim 6, wherein arranging comprises:

receiving from a remote player device the second input parameter via a communication network.

8. The method of claim 7, wherein arranging further comprises:

transmitting to the remote player device an indication associated with the game result via the communication network.

9. The method of claim 8, wherein the player device comprises at least one of: (i) a personal computer, (ii) a portable computing device, (iii) a personal digital assistant, (iv) a wireless telephone, and (v) a game terminal.

10. The method of claim 9, wherein the communication network comprises at least one of: (i) the Internet, (ii) a public network, (iii) a public switched telephone network, (iv) a proprietary network, and (v) a local area network.

11. The method of claim 4, further comprising:

arranging for the player to provide a payment in exchange for playing the game.

12. The method of claim 4, further comprising:

arranging for the player to receive a payment if the determined game result has a predetermined relationship to a successful game result.

13. The method of claim 4, wherein the physics simulation game is associated with propelling a simulated object, and a successful game result comprises the simulated object reaching a predetermined destination.

14. The method of claim 4, wherein the physics simulation game comprises a golf simulation, and the first and second input parameters include sets of parameters that include information associated with at least one of:

a golf ball velocity, a golf ball angular measurement, a golf ball rotation, a golf ball location, a golf club velocity, a golf club angular measurement, a golf club location, a golf club type, an aiming direction, and an aiming location.

15. The method of claim 4, wherein the physics simulation game comprises a golf simulation, and the first and second game conditions comprise information associated with at least one of:

a terrain feature, a terrain contour, a three-dimensional putting green terrain, a fairway layout, a fairway contour, a wind direction, a wind velocity, a friction parameter, a golf ball location, and a golf hole location.

16. The method of claim 4, wherein the physics simulation game comprises a golf simulation, and a successful game result comprises information associated with at least one of:

a distance between a golf ball and a golf hole, whether the golf ball comes to rest within the golf hole, and a number of strokes required to place the golf ball within the golf hole.

17. The method of claim 4, wherein the physics simulation game comprises at least one of:

a golf simulation;

a golf putting simulation;

a golf driving simulation;

a baseball simulation;

a basketball simulation;

a football simulation;

a soccer simulation;

a hockey simulation;

a bowling simulation;

a billiards simulation;

a throwing simulation;

a ring-toss simulation;

a darts simulation;

a shooting simulation; and a space simulation.

18. The method of claim 4, wherein the physics simulation game is associated with propelling a simulated object, a successful game result comprises the simulated object reaching a predetermined destination, and determining a second game condition comprises:

placing the simulated object at a first location;

propelling the simulated object in accordance with the first input parameter;

determining a second location of the simulated object based on the physics simulation and the first game condition; and establishing the first location as an initial location for the simulated object and the second location as the predetermined destination.

19. The method of claim 4, wherein the physics simulation game is associated with propelling a simulated object, a successful game result comprises the simulated object reaching a predetermined destination, and determining a second game condition comprises:

placing the simulated object at a first location;

propelling the simulated object in accordance with the first input parameter;

determining a second location of the simulated object based on the physics simulation and the first game condition; and establishing the second location as an initial location for the simulated object and the first location as the predetermined destination.

20. The method of claim 4, further comprising:

if the calculation determines that a set of possible input parameters to the physics simulation will propel the simulated object from the simulated object's potential initial location to the potential predetermined destination, establishing the potential initial location as the initial location and the potential predetermined destination as the predetermined destination.

21. The method of claim 4, wherein the physics simulation game is associated with propelling a simulated object from an initial location, a successful game result comprises the simulated object reaching a predetermined destination, and determining a second game condition comprises:

selecting an initial location; and performing a calculation to generate the predetermined destination such that a set of possible input parameters to the physics simulation will propel the simulated object from the initial location to the potential predetermined destination.

22. The method of claim 4, wherein the physics simulation game is associated with propelling a simulated object from an initial location, a successfull game result comprises the simulated object reaching a predetermined destination, and determining a second game condition comprises:

selecting the predetermined destination; and performing a calculation to generate a initial location such that a set of possible input parameters to the physics simulation will propel the simulated object from the initial location to the predetermined destination.

23. The method of claim 4, wherein the physics simulation game is associated with propelling a simulated object from an initial location, a successful game result comprises the simulated object reaching a predetermined destination, and determining a second game condition comprises:

selecting an initial location;

generating a list of appropriate predetermined destinations, such that for each appropriate predetermined destination a set of possible input parameters will propel the simulated object from the initial location to the predetermined destination; and selecting one of the appropriate predetermined destinations.

24. The method of claim 4, wherein the physics simulation game is associated with propelling a simulated object from an initial location, a successful game result comprises the simulated object reaching a predetermined destination, and determining a second game condition comprises:

selecting the predetermined destination;

generating a list of appropriate initial locations, such that for each appropriate initial location a set of possible input parameters to the physics simulation will propel the simulated object from the initial location to the predetermined destination; and selecting one of the appropriate initial locations.

25. An apparatus, comprising:

a processor; and a storage device in communication with said processor and storing instructions adapted to be executed by said processor to:

generate a first game condition for a physics simulation game;

generate an first input parameter;

determine a second game condition based on the first game condition and the first input parameter;

receive a second input parameter from a player; and determine a game result based upon the second input parameter, the first game condition, and the second game condition, wherein the physics simulation game is associated with propelling a simulated object from an initial location, a successful game result comprises the simulated object reaching a predetermined destination, and determining a second game condition comprises:

selecting a potential initial location and a potential predetermined destination, and performing a calculation to determine if a set of possible input parameters to the physics simulation will propel the simulated object from the potential initial location to the potential predetermined destination, and if the calculation determines that no set of possible input parameters to the physics simulation will propel the simulated object from the potential initial location to the potential predetermined destination, adjust at least one of the potential initial location and the potential predetermined destination.

26. The apparatus of claim 25, wherein said storage device further stores at least one of (i) a player database; and (ii) a game database.

27. The apparatus of claim 25, further comprising:

a communication device coupled to said processor and adapted to communicate with at least one of: (i) a player device, and (ii) a game controller.

28. A medium storing instructions adapted to be executed by a processor to perform a method of conducting a game associated with a physics simulation, the physics simulation being adapted to generate a game result, said method comprising:

generating a first game condition for a physics simulation game;

generating an first input parameter;

determining a second game condition based on the first game condition and the first input parameter;

receiving a second input parameter from a player; and determining a game result based upon the second input parameter, the first game condition, and the second game condition wherein the physics simulation game is associated with propelling a simulated object from an initial location, a successful game result comprises the simulated object reaching a predetermined destination, and determining a second game condition comprises:

selecting a potential initial location and a potential predetermined destination; and performing a calculation to determine if a set of possible input parameters to the physics simulation will propel the simulated object from the potential initial location to the potential predetermined destination; and if the calculation determines that no set of possible input parameters to the physics simulation will propel the simulated object from the potential initial location to the potential predetermined destination, adjusting at least one of the potential initial location and the potential predetermined destination.

29. A computer-implemented method of conducting a golf game associated with a golf simulation, the golf simulation being adapted to generate a game result based on a set of input parameters, comprising:

establishing a golf game condition;

determining that at least one single set of possible input parameters to the golf simulation will produce a successful game result given the established golf game condition;

altering the golf game condition until at least one single set of possible input parameters to the golf simulation will produce a successful game result given the altered golf game condition;

arranging for the player to provide a payment in exchange for playing the golf game;

initiating play of the golf game;

receiving from a remote player device a set of player input parameters via a communication network;

determining a game result based on the received player input parameters, the golf game condition, and the golf simulation, wherein the golf game is associated with hitting a simulated golf ball and the game result comprises the simulated golf ball reaching a destination;

transmitting to the remote player device an indication associated with the game result via the communication network; and arranging for the player to receive a payment if the destination of the simulated golf ball is within a predetermined distance of a simulated golf hole.

30. A method comprising:

determining a set of game conditions and a single set of input parameters for a physics simulation game that includes a game result that is a function of the set of game conditions and the single set of input parameters;

determining if, based on the physics simulation, the single set of input parameters could result in a successful game result given the set of game conditions; and altering the set of game conditions until the single set of input parameters could result in a successful game result given the altered set of game conditions.

31. A method comprising:

determining an initial set of game conditions and a range of input parameters for a physics simulation game that includes a game result, wherein the game result is a function of a set of game conditions and a single set of input parameters; and altering the initial set of game conditions until the range of input parameters includes at least one single set of input parameters that would result in a successful game result given the altered set of game conditions, if, based on the physics simulation, the range of input parameters does not include at least one single set of input parameters that would result in a successful game result given the initial set of game conditions.

* * * * *